United States Patent [19]
Cheng et al.

[11] Patent Number: 6,073,211
[45] Date of Patent: Jun. 6, 2000

[54] METHOD AND SYSTEM FOR MEMORY UPDATES WITHIN A MULTIPROCESSOR DATA PROCESSING SYSTEM

[75] Inventors: Kai Cheng; Hoichi Cheong; Kimming So, all of Austin, Tex.

[73] Assignee: International Business Machines Corporation, Armonk, N.Y.

[21] Appl. No.: 08/844,289

[22] Filed: Apr. 18, 1997

Related U.S. Application Data

[63] Continuation of application No. 08/354,697, Dec. 13, 1994, abandoned.

[51] Int. Cl.[7] .................................................. G06F 12/12
[52] U.S. Cl. ..................... 711/122; 711/117; 711/118; 711/119; 711/120; 711/121; 711/141; 711/144; 711/145; 711/148; 711/155; 711/152; 711/210
[58] Field of Search .................................... 711/130, 141, 711/144, 145, 148, 155, 117–122, 152, 210

[56] References Cited

U.S. PATENT DOCUMENTS

| | | | |
|---|---|---|---|
| 4,430,701 | 2/1984 | Christian et al. | 364/200 |
| 4,604,694 | 8/1986 | Hough | 364/200 |
| 4,755,930 | 7/1988 | Wilson, Jr. et al. | 395/449 |
| 4,847,754 | 7/1989 | Obermarck et al. | 364/200 |
| 5,113,509 | 5/1992 | Pennings et al. | 395/425 |
| 5,175,829 | 12/1992 | Stumpf et al. | 395/375 |
| 5,193,167 | 3/1993 | Sites et al. | 395/425 |
| 5,210,848 | 5/1993 | Liu | 395/451 |
| 5,226,143 | 7/1993 | Baird et al. | 395/425 |
| 5,265,233 | 11/1993 | Frailong et al. | 395/425 |
| 5,276,848 | 1/1994 | Gallagher et al. | 395/425 |
| 5,555,382 | 9/1996 | Thaller et al. | 395/293 |
| 5,706,464 | 1/1998 | Moore et al. | 711/122 |

OTHER PUBLICATIONS

Diefendorff et al., "Evolution of the Power PC Architecture," IEEE Micro, Apr. 1994, pp. 34–49.
Paap et al., "POWERPC TM: A Performance Architecture," 1993, pp. 104–108.
"Handling Reservations in Multiple–Level Cache", IBM Technical Disclosure Bulletin, Dec. 1993, pp. 441–446.

*Primary Examiner*—John W. Cabeca
*Assistant Examiner*—Denise Tran
*Attorney, Agent, or Firm*—Anthony V. S. England; Brian F. Russell; Andrew J. Dillon

[57] ABSTRACT

An apparatus is disclosed which supports memory updates within a data processing system including a number of processors. The apparatus includes a memory hierarchy including one or more upper levels of memory. Each upper level within the memory hierarchy includes one or more memory units which each store a subset of all data stored within an associated memory unit at a lower level of the memory hierarchy. Each memory unit at the highest level within the memory hierarchy is associated with a selected processor. In addition, the apparatus includes a reservation indicator associated with each memory unit within the memory hierarchy. For memory units at the highest level within the memory hierarchy, the reservation indicator specifies an address for which the processor associated with that memory unit holds a reservation. At each lower level within the memory hierarchy, the reservation indicator specifies addresses for which associated memory units at higher levels within the memory hierarchy hold a reservation. A reservation for a selected address within a memory unit is resolved at a highest level within the memory hierarchy at which a memory unit stores data associated with the selected address exclusive of other memory units at that level, thereby enhancing reservation protocol efficiency.

20 Claims, 12 Drawing Sheets

CPU Reservation Register and Control Logic

PLA for Reset Reservation Control  140a

*Fig. 11A*

```
ResetRsv1: PLA
  ClearReq............|  IIII IIII IIII IIII .... .... .... ....  .... .... .... ....  |
  ClearAnyHit.........|  .... .... .... ....  IIII IIII IIII IIII .... .... .... ....  |
  ClearRmtHit.........|  .... .... .... ....  .... .... .... ....  IIII IIII IIII IIII |
  CPU_Mask(16)........|  I... .... .... ....  .... .... .... ....  O... .... .... .... |
  CPU_Mask(17)........|  .I.. .... .... ....  .... .... .... ....  .O.. .... .... .... |
  CPU_Mask(18)........|  ..I. .... .... ....  .... .... .... ....  ..O. .... .... .... |
  CPU_Mask(19)........|  ...I .... .... ....  .... .... .... ....  ...O .... .... .... |
  CPU_Mask(20)........|  .... I... .... ....  .... .... .... ....  .... O... .... .... |
  CPU_Mask(21)........|  .... .I.. .... ....  .... .... .... ....  .... .O.. .... .... |
  CPU_Mask(22)........|  .... ..I. .... ....  .... .... .... ....  .... ..O. .... .... |
  CPU_Mask(23)........|  .... ...I .... ....  .... .... .... ....  .... ...O .... .... |
  CPU_Mask(24)........|  .... .... I... ....  .... .... .... ....  .... .... O... .... |
  CPU_Mask(25)........|  .... .... .I.. ....  .... .... .... ....  .... .... .O.. .... |
  CPU_Mask(26)........|  .... .... ..I. ....  .... .... .... ....  .... .... ..O. .... |
  CPU_Mask(27)........|  .... .... ...I ....  .... .... .... ....  .... .... ...O .... |
  CPU_Mask(28)........|  .... .... .... I...  .... .... .... ....  .... .... .... O... |
  CPU_Mask(29)........|  .... .... .... .I..  .... .... .... ....  .... .... .... .O.. |
  CPU_Mask(30)........|  .... .... .... ..I.  .... .... .... ....  .... .... .... ..O. |
  CPU_Mask(31)........|  .... .... .... ...I  .... .... .... ....  .... .... .... ...O |
  CPURsvHit(16).......|  .... .... .... ....  I... .... .... ....  I... .... .... .... |
  CPURsvHit(17).......|  .... .... .... ....  .I.. .... .... ....  .I.. .... .... .... |
  CPURsvHit(18).......|  .... .... .... ....  ..I. .... .... ....  ..I. .... .... .... |
  CPURsvHit(19).......|  .... .... .... ....  ...I .... .... ....  ...I .... .... .... |
  CPURsvHit(20).......|  .... .... .... ....  .... I... .... ....  .... I... .... .... |
  CPURsvHit(21).......|  .... .... .... ....  .... .I.. .... ....  .... .I.. .... .... |
  CPURsvHit(22).......|  .... .... .... ....  .... ..I. .... ....  .... ..I. .... .... |
  CPURsvHit(23).......|  .... .... .... ....  .... ...I .... ....  .... ...I .... .... |
  CPURsvHit(24).......|  .... .... .... ....  .... .... I... ....  .... .... I... .... |
  CPURsvHit(25).......|  .... .... .... ....  .... .... .I.. ....  .... .... .I.. .... |
  CPURsvHit(26).......|  .... .... .... ....  .... .... ..I. ....  .... .... ..I. .... |
  CPURsvHit(27).......|  .... .... .... ....  .... .... ...I ....  .... .... ...I .... |
  CPURsvHit(28).......|  .... .... .... ....  .... .... .... I...  .... .... .... I... |
  CPURsvHit(29).......|  .... .... .... ....  .... .... .... .I..  .... .... .... .I.. |
  CPURsvHit(30).......|  .... .... .... ....  .... .... .... ..I.  .... .... .... ..I. |
  CPURsvHit(31).......|  .... .... .... ....  .... .... .... ...I  .... .... .... ...I |
  ----------------------------------------------------------------------------------
  ResetRsv(16)........|  I... .... .... ....  I... .... .... ....  I... .... .... .... |
  ResetRsv(17)........|  .I.. .... .... ....  .I.. .... .... ....  .I.. .... .... .... |
  ResetRsv(18)........|  ..I. .... .... ....  ..I. .... .... ....  ..I. .... .... .... |
  ResetRsv(19)........|  ...I .... .... ....  ...I .... .... ....  ...I .... .... .... |
  ResetRsv(20)........|  .... I... .... ....  .... I... .... ....  .... I... .... .... |
  ResetRsv(21)........|  .... .I.. .... ....  .... .I.. .... ....  .... .I.. .... .... |
  ResetRsv(22)........|  .... ..I. .... ....  .... ..I. .... ....  .... ..I. .... .... |
  ResetRsv(23)........|  .... ...I .... ....  .... ...I .... ....  .... ...I .... .... |
  ResetRsv(24)........|  .... .... I... ....  .... .... I... ....  .... .... I... .... |
  ResetRsv(25)........|  .... .... .I.. ....  .... .... .I.. ....  .... .... .I.. .... |
  ResetRsv(26)........|  .... .... ..I. ....  .... .... ..I. ....  .... .... ..I. .... |
  ResetRsv(27)........|  .... .... ...I ....  .... .... ...I ....  .... .... ...I .... |
  ResetRsv(28)........|  .... .... .... I...  .... .... .... I...  .... .... .... I... |
  ResetRsv(29)........|  .... .... .... .I..  .... .... .... .I..  .... .... .... .I.. |
  ResetRsv(30)........|  .... .... .... ..I.  .... .... .... ..I.  .... .... .... ..I. |
  ResetRsv(31)........|  .... .... .... ...I  .... .... .... ...I  .... .... .... ...I |
END PLA;
```

PLA for Reset Reservation Control — 140b

*Fig. 11B*

METHOD AND SYSTEM FOR MEMORY UPDATES WITHIN A MULTIPROCESSOR DATA PROCESSING SYSTEM

This is a continuation of application Ser. No. 08/354,697, filed Dec. 13, 1994, now abandoned.

BACKGROUND OF THE INVENTION

1. Technical Field

The present invention relates in general to an improved method and system for data processing, and in particular to an improved method and system for memory updates within a multiprocessor data processing system. Still more particularly, the present invention relates to an improved method and system for memory updates within a multiprocessor data processing system which can complete atomic load and store instructions at a higher level within a memory hierarchy without interrogating lower levels of the memory hierarchy.

2. Description of the Related Art

In order to enhance performance, state-of-the-art data processing systems often utilize multiple processors which concurrently execute portions of a given task. To further enhance performance, such multiple processor (MP) data processing systems often utilize a multi-level memory hierarchy to reduce the access time required to retrieve data from memory. A MP data processing system may include a number of processors, each with an associated level-one (L1) cache, a number of level-two (L2) caches, and a number of modules of system memory. Typically, the memory hierarchy is arranged such that each L2 cache is accessed by a subset of the L1 caches within the system via a local bus. In turn, each L2 cache and system memory module is coupled to a system bus or interconnect switch, such that an L2 cache within the MP data processing system may access data from any of the system memory modules coupled to the bus or interconnect switch.

Because each of the number of processors within a MP data processing system may modify data, MP data processing systems must employ a protocol to maintain memory coherence. For example, MP data processing systems utilizing PowerPC™ RISC processors utilize a coherency protocol having four possible states: modified (M), exclusive (E), shared (S), and invalid (I). The MESI state associated with each cache line (i.e., the line state) informs the MP data processing system what memory operations are required to maintain memory coherence following an access to that cache line. Depending upon the type of MP data processing system utilized, a memory protocol may be implemented in different ways. In snoop-bus MP data processing systems, each processor snoops transactions on the bus to determine if cached data has been requested by another processor. Based upon request addresses snooped on the bus, each processor sets the MESI state associated with each line of its cached data. In contrast, within a directory-based MP data processing system, a processor forwards memory requests to a directory at a lower level of memory for coherence ownership arbitration. For example, if a first processor (CPUa) requests data within a memory line that a second processor (CPUb) owns in exclusive state in CPUb's associated L1 cache, CPUa transmits a load request to the system memory module which stores the requested memory line. In response to the load request, the memory directory within the interrogated system memory module loads the requested memory line to CPUa and transmits a cross-interrogation message to CPUb. In response to the cross-interrogation message, CPUb will mark the requested cache line as shared in its associated L1 cache.

Among designers of MP data processing systems, there has been a recent interest in the use of load-reserve and store-conditional instructions which enable atomic accesses to memory from multiple processors while maintaining memory coherence. For example, load-reserve and store-conditional instructions on a single word operand have been implemented in the PowerPC™ RISC processor instruction set with the LARWX and STCWX instructions, respectively, which will be referenced as LARX and STCX. In MP data processing systems which support LARX and STCX or analogous instructions, each processor within the system includes a reservation register. When a processor executes a LARX to a variable, the processor, known as the requesting processor, loads the contents of the address storing the variable from the requesting processor's associated L1 cache into a register and the address of the memory segment containing the variable into the reservation register. Typically, the reservation address indexes a segment of memory, called a reservation granule, having a data width less than or equal to the requesting processor's L1 cache line. The requesting processor is then said to have a reservation with respect to the reservation granule. The processor may then perform atomic updates of the reserved variable utilizing store-conditional instructions.

When a processor executes a STCX to a variable contained in a reservation granule for which the processor has a reservation, the processor stores the contents of a designated register to the variable's address and then clears the reservation. If the processor does not have a reservation for the variable, the instruction fails and the memory store operation is not performed. In general, the processor's reservation is cleared if either a remote processor stores data to the address containing the reserved variable or the reserving processor executes a STCX instruction. Additional background information about load-reserve and store-conditional instructions in a multiprocessor environment may be found, for example, in Sites, et al., U.S. Pat. No. 5,193,167.

Typically, MP data processing systems which include a memory hierarchy track the reservation state of each reservation granule utilizing a reservation protocol similar in operation to the memory coherence protocol discussed above. Such MP data processing systems generally record each processor's reservation at the system memory (main store) level. For example, each main memory module may include a reservation register for each processor that indicates which reservation granule, if any, is reserved by the associated processor. Because processor reservations are maintained at the system memory level, each execution of an instruction which affects the reservation status of a reserved granule requires that a reservation message be transmitted to the system memory module containing the target reservation granule. These reservation messages slow overall MP system performance because of the additional traffic they create on the interconnect switch or system bus and because of delays in determining if a requesting processor may successfully execute a STCX.

Consequently, it would be desirable to provide an improved method and system for memory updates in a MP data processing system in which reservations may be resolved at higher levels within the memory hierarchy, thereby minimizing reservation messaging and enhancing MP data processing system performance.

SUMMARY OF THE INVENTION

It is therefore one object of the present invention to provide an improved method and system for data processing.

It is another object of the present invention to provide an improved method and system for memory updates within a multiprocessor data processing system.

It is yet another object of the present invention to provide an improved method and system for memory updates within a multiprocessor data processing system which can complete atomic load and store instructions at a higher level within a memory hierarchy without interrogating lower levels of the memory hierarchy.

The foregoing objects are achieved as is now described. An apparatus is disclosed which supports memory updates within a data processing system including a number of processors. The apparatus includes a memory hierarchy including one or more upper levels of memory. Each upper level within the memory hierarchy includes one or more memory units which each store a subset of all data stored within an associated memory unit at a lower level of the memory hierarchy. Each memory unit at the highest level within the memory hierarchy is associated with a selected processor. In addition, the apparatus includes a reservation indicator associated with each memory unit within the memory hierarchy. For memory units at the highest level within the memory hierarchy, the reservation indicator specifies an address for which the processor associated with that memory unit holds a reservation. At each lower level within the memory hierarchy, the reservation indicator specifies addresses for which associated memory units at higher levels within the memory hierarchy hold a reservation. A reservation for a selected address within a memory unit is resolved at a highest level within the memory hierarchy at which a memory unit stores data associated with the selected address exclusive of other memory units at that level, thereby enhancing reservation protocol efficiency.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 11A and 11B together depict the Reset Reservation Control Logic within the PLA illustrated in FIG. 6.

DETAILED DESCRIPTION OF PREFERRED EMBODIMENT

Figure 1:
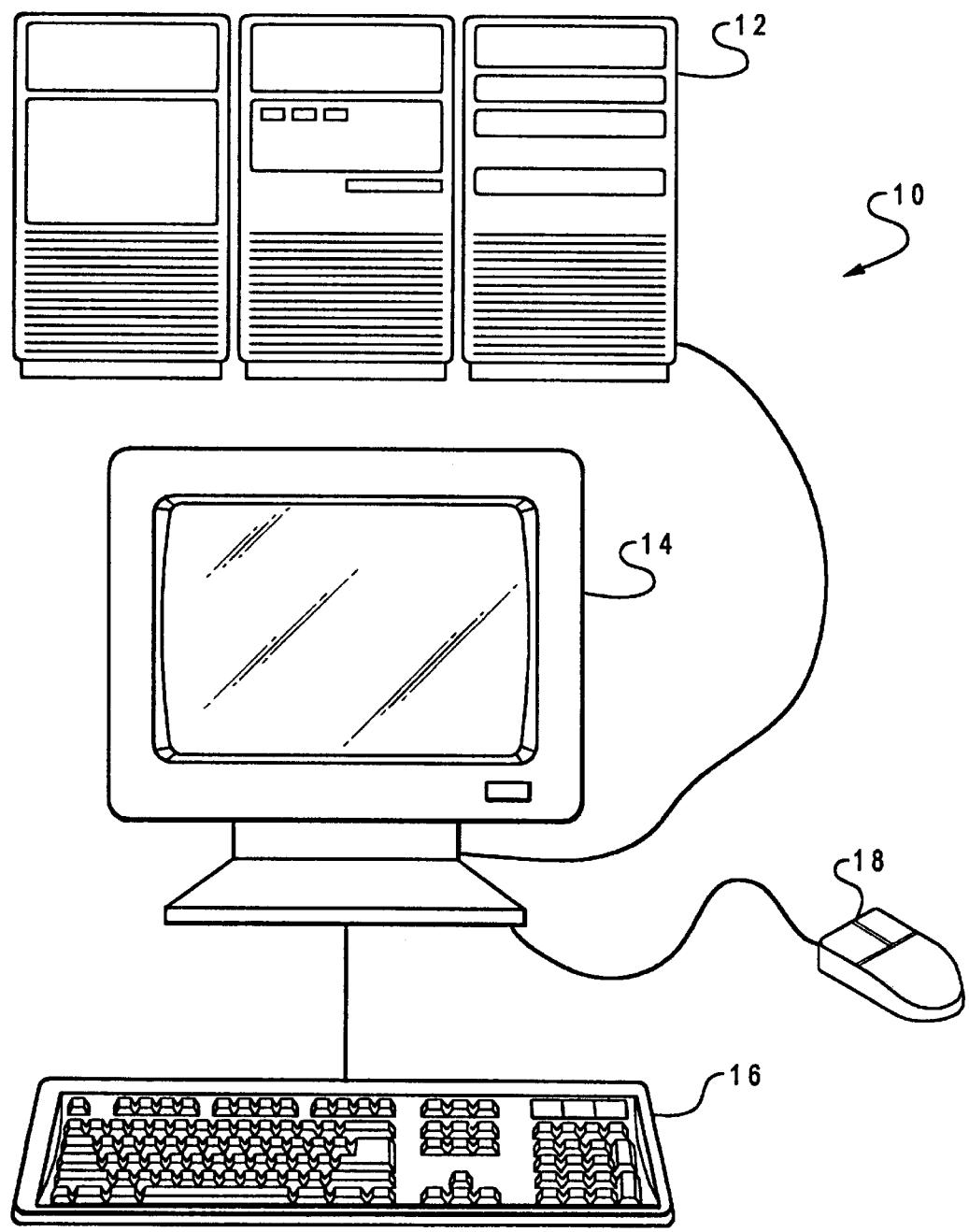
FIG. 1 illustrates a multiprocessor data processing system which utilizes the method and system of the present invention.

With reference now to the figures and in particular with reference to FIG. 1, there is illustrated a multiprocessor data processing system which utilizes the method and system of the present invention to support memory updates. As illustrated, data processing system 10 includes processing unit 12, display device 14, keyboard 16, and graphical pointing device 18. As will be appreciated by those skilled in the art, data processing system 10 may include additional display devices, keyboards, and graphical pointing devices (not illustrated) in order to serve multiple users. As is well-known in the art, a user may input data to processing unit 12 utilizing keyboard 16 or graphical pointing device 18. Processing unit 12 outputs data to a user via display device 14.

Figure 2:
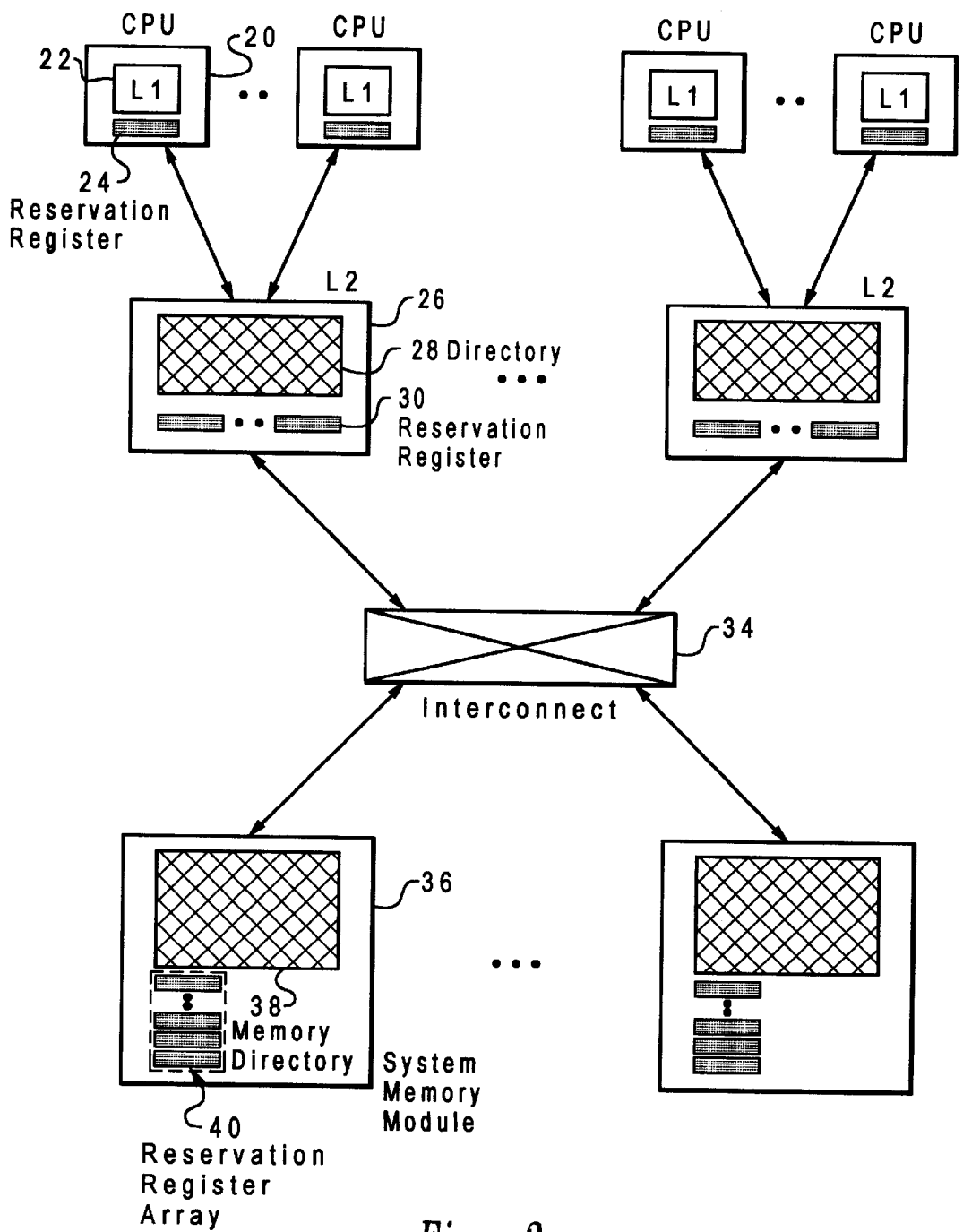
FIG. 2 depicts a block diagram of the multiple processors and memory hierarchy within the data processing system illustrated in FIG. 1.

Referring now to FIG. 2, there is depicted a block diagram of a preferred embodiment of the memory hierarchy and multiple central processing units within processing unit 12 of data processing system 10. In a preferred embodiment of the present invention, each central processing unit (CPU) 20 comprises a PowerPC™ RISC processor capable of executing load-reserve and store-conditional instructions. Although load-reserve and store-conditional instructions will be referenced in the following description by the PowerPC™ RISC processor instruction set mnemonics LARX and STCX, respectively, those skilled in the art will appreciate that the present invention is applicable to any MP data processing system which utilizes load-reserve and store-conditional instructions.

As illustrated, each CPU 20 includes a reservation register 24 and an on-board level-one (L1) cache 22, which comprises the highest level of the memory hierarchy. FIG. 2 depicts an embodiment in which L1 cache 22 is a unified cache which stores both instructions and data. However, those skilled in the art will appreciate that the present invention is also applicable to MP data processing systems which utilize separate caches that store instructions and data, respectively. In a preferred embodiment of the present invention, the memory hierarchy is cacheable, i.e., except at the system memory level, each memory unit only accesses data within an associated memory unit at the following lower level within the memory hierarchy. Thus, each CPU 20 accesses data stored within its associated L1 cache 22. In turn, each L1 cache 22 retrieves nonresident data requested by its associated CPU 20 from an associated level-two (L2) cache 26. Each L2 cache 26 includes directory 28, which indexes the entries resident within L2 cache 26, and one reservation register 30 for each L1 cache 22 which accesses L2 cache 26. Although the present invention will be described with reference to a preferred embodiment in which L1 cache 22 and L2 cache 26 have the same line size, those skilled in the art will appreciate that the present invention may be easily implemented in MP data processing systems in which the 12 cache line size is a multiple of the L1 cache line size.

When L1 cache 22 requests data not resident within L2 cache 26, L2 cache 26 must load the requested data from a system memory module 36 via interconnect 34, which in a perferred embodiment of the present invention is a system bus or interconnect switch. Each system memory module 36 includes memory directory 38 and reservation register array 40. The structure and operation of a preferred embodiment of reservation register array 40 will be described in greater detail with reference to FIG. 6.

Because each CPU 20 within processing unit 12 may modify data stored in any of system memory modules 36, processing unit 12 employs a memory coherence protocol to maintain data coherency between the multiple levels of memory within the memory hierarchy. In a preferred embodiment of the present invention in which each CPU 20 comprises a PowerPC™ RISC processor, the MESI coherency protocol is utilized. As mentioned above, in the MESI protocol each reservation granule, which in a preferred embodiment is a 64-byte memory line, is stored in association with an line state indicating one of the four following states: modified (M), exclusive (E), shared (S), and invalid (I). It is important to note the interaction between the reservation protocol utilized by the present invention and the MESI memory coherency protocol. For a STCX instruction to successfully execute, the requesting CPU 20 must own the memory line containing the reserved variable in modified or exclusive state. Consequently, if the memory line containing the reserved variable has a shared or invalid line state, the requesting CPU 20 must obtain exclusive ownership of the line or have the memory update fail. Additional information about the MESI coherency protocol may be found, for example, in *PowerPC™ 601 RISC Microprocessor User's Manual,* available from IBM Corporation.

Reservation structure at L1 cache level

Figure 3:
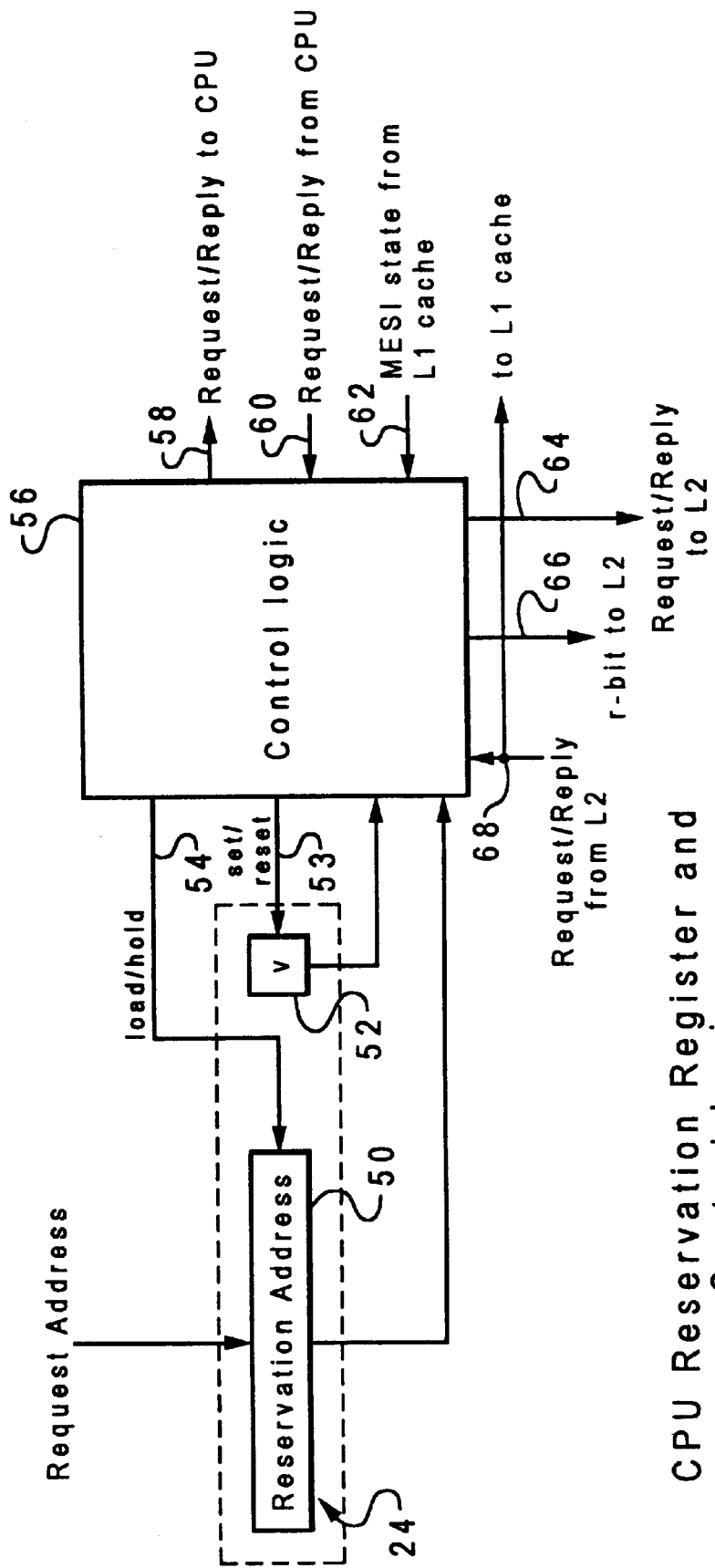
FIG. 3 illustrates a block diagram of a reservation register at the CPU/L1 cache level of the memory hierarchy.

With reference now to FIG. 3, there is illustrated a block diagram representation of reservation register 24 within CPU 20 and control logic 56 which manages reservation register 24. As illustrated, reservation register 24 includes reservation address field 50 and valid bit 52. Reservation address field 50 stores the real address of the memory line containing the variable reserved by CPU 20. When CPU 20 has a reservation with respect to a variable within the memory line specified by reservation address field 50, valid bit 52 is set to 1.

In a preferred embodiment of the present invention, control logic 56 is implemented within the cache control logic of CPU 20. CPU 20 communicates LARX and STCX requests to control logic 56 via request/reply input line 60. Control logic 56 responds to messages from CPU 20 via request/reply output line 58. Similarly, control logic 56 communicates replacement and reservation messages (described below) to L2 cache 26 via replacement line 66 and request/reply output line 64. Control logic 56 receives reservation messages from L2 cache 26 via request/reply input line 68.

Executing a LARX

When CPU 20 executes a LARX to a variable X, the memory line containing X may or may not be resident within L1 cache 22. If the memory line containing variable X is not resident within L1 cache 22, CPU 20 issues a LARX load to load the requested line from lower level memory. Once the memory line containing variable X is resident within L1 cache 22 (either loaded from lower level memory or already resident), control logic 56 strobes the address of the memory line into reservation address field 50 utilizing load/hold line 54. In addition by strobing set/reset line 53, control logic 56 initializes valid bit 52 to a 1 to indicate that CPU 20 has a reservation for the specified memory line. The line state of the reserved line containing X is set within L1 cache 22 according to the MESI protocol independently from the reservation. The line state of the reserved line may be exclusive or shared depending upon whether the reserved memory line is shared in other CPUs.

Executing a STCX

According to the method and system of the present invention, reservations for a variable are resolved at a highest level within the memory hierarchy which exclusively owns the reservation granule containing the reserved variable. Thus, if CPU 20 executes a STCX to a variable X and valid bit (V) 52 is set to 0, signifying that CPU 20 no longer has a reservation for the memory line containing X, the instruction fails without performing the store. However, if valid bit 52 is set to 1, the STCX instruction completes successfully in either of two cases. In the first case, the STCX instruction will complete successfully if the line state (MESI state) of the memory line containing X indicates that the memory line is exclusive in L1 cache 22. In this case, in contrast to prior art systems, the reservation of CPU 20 with respect to X may be resolved at L1 cache 22 without passing a reservation message to lower levels of memory within the memory hierarchy. The reservation is guaranteed to be valid since the exclusive line state of the reserved line indicates that the requesting CPU is the only processor with a reservation for that memory line. In the second case, as will be described below, a STCX instruction to a variable X will also complete successfully if the line containing X is not resident within L1 cache 22 or is not exclusive within cache 22 and a STCX miss reservation message issued to lower level memory is returned with the requested memory line in the exclusive state.

As described above, upon successful completion of a STCX instruction, control logic 56 clears valid bit 52 by strobing set/reset line 53. Valid bit 52 is also cleared in response to cross-interrogation and STCX miss reservation messages from L2 cache 26. If CPU 20 executes a STCX to a variable contained in a memory line that is not resident within L1 cache 22, control logic 56 issues a STCX miss request reservation message to L2 cache 26 to resolve the reservation at a lower level of memory. If the STCX miss request is rejected, that is, if the resolution of the reservation for the requested address at a lower level within the memory hierarchy indicates that the reservation of the requesting processor is invalid, control logic 56 clears valid bit 52. Similarly, if a remote CPU executes a STCX to a variable contained in a memory line for which CPU 20 has a reservation, L2 cache 26 issues a cross-interrogation message to control logic 56 to clear valid bit 52.

Reservation structure at the L2 cache level

Figure 4:
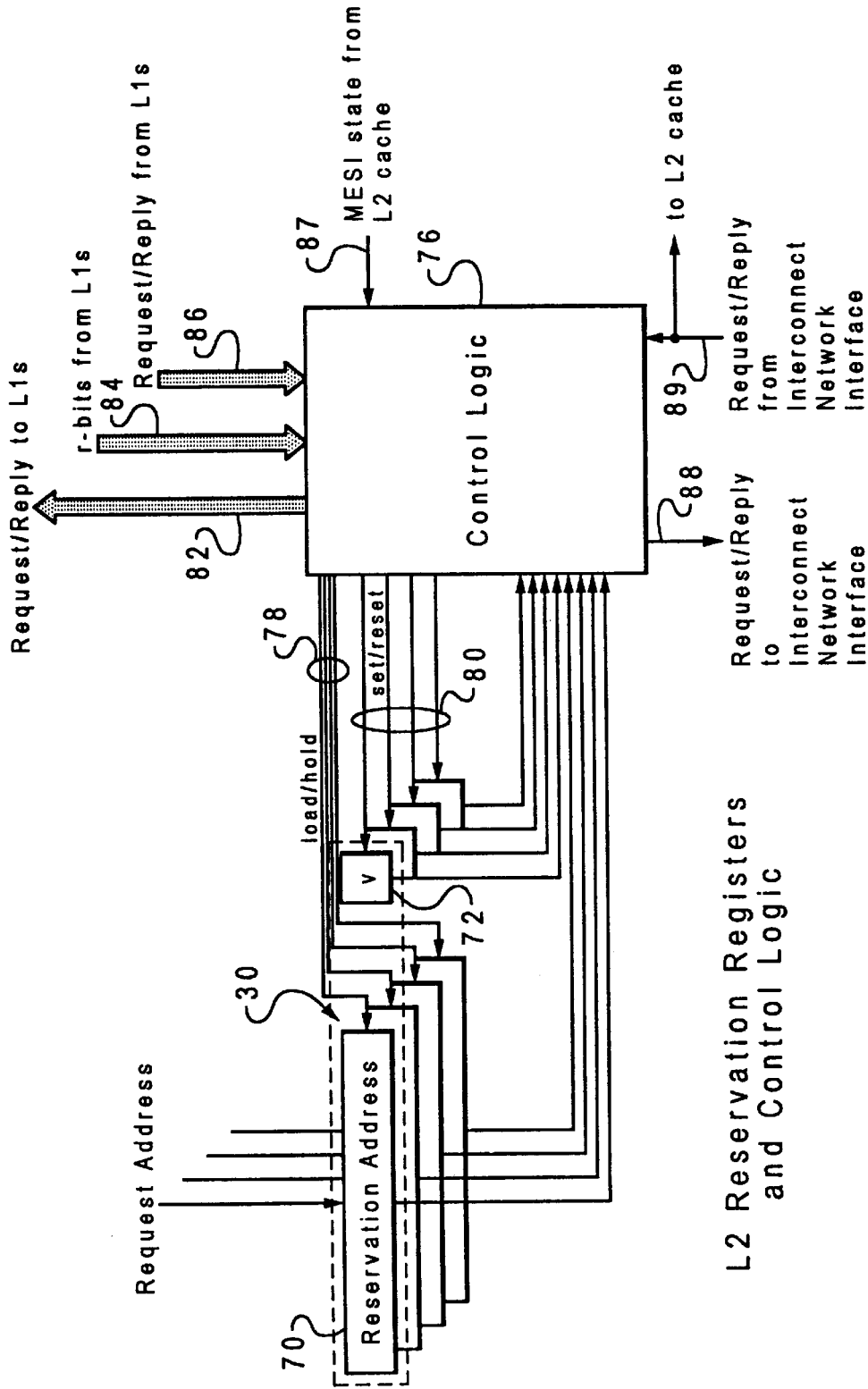
FIG. 4 depicts a block diagram of a reservation register at the L2 cache level of the memory hierarchy.

Referring now to FIG. 4, there is depicted a block diagram of a set of reservation registers 30 within L2 cache 26 and control logic 76 which manages each reservation register 30. As was described above, L2 cache 26 includes one reservation register 30 for each CPU 20 which accesses L2 cache 26. FIG. 4 depicts a preferred embodiment of the present invention in which each L2 cache 26 within the memory hierarchy illustrated in FIG. 2 is accessed by four CPUs 20. Each reservation register 30 comprises reservation address field 70 and valid bit 72 and functions identically to reservation register 24 depicted FIG. 3.

As will be appreciated by those skilled in the art, control logic 76 may be implemented by suitable logic within the cache control logic of L2 cache 26. Control logic 76 communicates replacement and reservation messages to and from control logic 56 of each associated CPU 20 via replacement lines 84 and request/reply input and output lines 82 and 86. Similarly, control logic 76 communicates reservation messages to system memory modules via request/reply input and output lines 88 and 89, respectively.

Replacing an L1 cache line containing a reserved variable

As is well-known in the art, when CPU 20 requests data not resident within L1 cache 22, a cache miss occurs. When a cache miss occurs and L1 cache 22 is full, L1 cache 22 must replace a resident cache line with a memory line containing the requested data. Typically, the replaced line is selected according to a least recently used (LRU) or other replacement algorithm. When L1 cache 22 replaces a line containing a reserved variable, control logic 56 transmits a replacement with reservation message to L2 cache 26 via replacement line 66 in conduction with the reservation address, which is presented to each reservation register 30 as a request address. As will be understood by those skilled in the art, the replacement with reservation message could comprise a specific replacement with reservation command or a replacement with reservation signal. When L2 cache 26 receives the replacement with reservation message, control logic 76 stores the address of the replaced line into reservation address field 70 of the reservation register 30 corresponding to CPU 20 by strobing the appropriate one of load/hold lines 78. In addition, control logic 76 sets valid bit 72 to a 1 by strobing the appropriate line within set/reset lines 80.

Resolving reservation requests at L2 cache level

Although the reservation for a replaced memory line is retained at CPU 20, a STCX to a variable X within the replaced line requires that a reservation message be transmitted to L2 cache 26 since L1 cache 22 does not own the reserved memory line in an exclusive state. However, the reservation may still be resolved at the L2 cache level of the memory hierarchy without passing a reservation message to a system memory module 36 if L2 cache 26 owns the reserved line in an exclusive state. The line state associated with the reserved line is determined from the MESI state input to control logic 76 from L2 cache 26 via line state input lines 87. The MESI bits input via line state input lines 87 specify not only the MESI state for L2 ownership of the reserved line, but also the line state of the reserved line within each CPU 20 accessing L2 cache 26.

If L2 cache 26 owns the reserved line exclusively, control logic 76 resolves a STCX reservation request by simply comparing the address of the reserved memory line (i.e., the request address) with reservation addresses stored in each reservation register 30. If the requesting CPU 20 has the only valid reservation for the reserved memory line, control logic 76 responds by loading the reserved memory line to L1 cache 22 within requesting CPU 20 in conjunction with a message that CPU 20 owns the memory line exclusively. Consequently, CPU 20 may successfully execute a STCX to the reserved variable. If L2 cache 26 owns the memory line exclusively, but more than one CPU accessing L2 cache 26 has a reservation for the reserved memory line (i.e., the line is shared), control logic 76 issues a cross-interrogation request to the non-requesting processor(s) with reservations. The cross-interrogation request will clear the valid bit of the reservation registers at the non-requesting CPUs and mark the line state associated with the reserved line as invalid.

If L2 cache 26 does not own the reserved memory line exclusive of other L2 caches, as indicated by a shared line state associated with the reserved line, control logic 76 forwards the reservation request to the system memory module 36 which contains the reserved memory line via request/reply output lines 88 and interconnect 34.

Replacing an L2 cache line containing a reserved variable

Like L1 cache 22, L2 cache 26 also must replace a line when L2 cache 26 is full and a line requested by L1 cache 22 does not reside within L2 cache 26. To maintain memory coherency, if a portion of or an entire L2 cache line being replaced also resides in L1 cache 22, the line or lines within L1 cache 22 containing the replaced L2 line must be purged from L1 cache 22. If the line(s) purged from L1 cache 22 contain a reserved variable, reservation register 24 must also be updated. When L1 cache 22 receives the MESI protocol message that a resident line must be purged, L1 cache 22 marks the indicated line or lines invalid, but retains the reservation at the processor level with valid bit 52 set to 1. L1 cache 22 will then acknowledge receipt of the MESI protocol message by transmitting a replacement message via replacement line 66 in conjunction with the reservation address.

When L2 cache 26 receives the replacement message via one of replacement lines 84, control logic 76 strobes the appropriate one of load/hold lines 78 to store the address of the memory line containing the reserved variable (i.e., the request address) within the reservation register 30 associated with the CPU 20 which accesses data from L1 cache 22. In addition, control logic 76 strobes the appropriate one of set/reset lines 80 to initialize valid bit 72 to a 1. L2 cache 26 then replaces the selected line. Control logic 76 transmits the replacement request via request/reply output line 88 and interconnect 34 to the system memory module 36 which stores the replaced memory line. Upon receiving the replacement request from L2 cache 26, system memory module 36 stores the address of the memory line containing the reserved variable into the reservation register within reservation register array 40 corresponding to CPU 20 and sets the valid bit associated with the reservation register to a 1.

Reservation structure at system memory level

Figure 5:
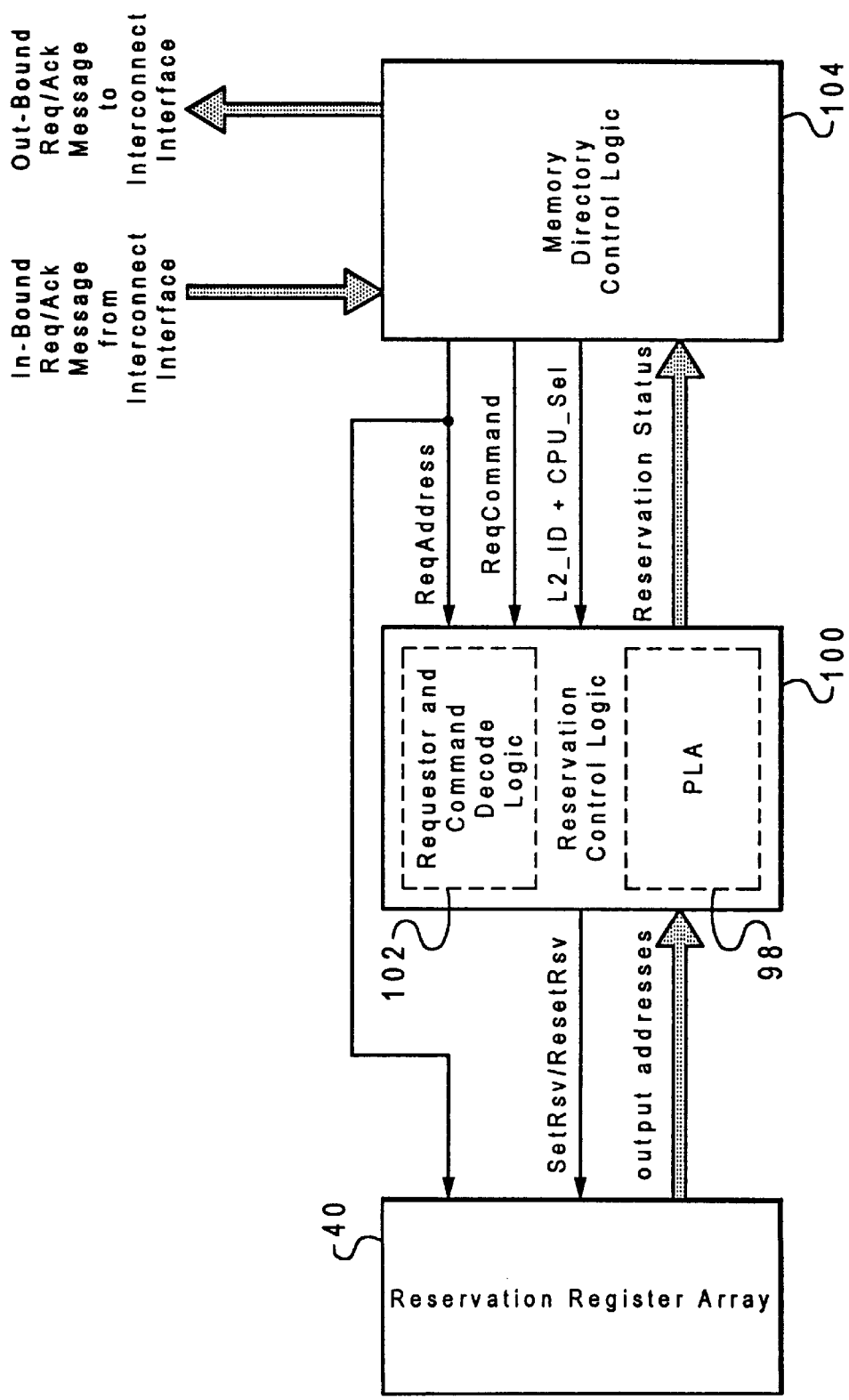
FIG. 5 depicts a block diagram of the reservation and memory directory control logic at the system memory level of the memory hierarchy.

With reference now to FIG. 5, there is illustrated a block diagram depicting the interrelationship of reservation register array 40, reservation control logic 100, and memory directory control logic 104 within system memory module 36. As illustrated, both MESI protocol and reservation messages are communicated between system memory module 36 and L2 caches within the memory hierarchy by memory directory control logic 104. In a preferred embodiment of the present invention, MESI protocol and reservation information are transmitted together in a single message to reduce messaging traffic on interconnect 34. Once memory directory control logic 104 receives a message containing a reservation message, memory directory control logic 104 extracts the encoded reservation message and forwards the request address, the request command (e.g., LARX, STCX, store, replacement), and requester information (L2_ID and CPU_Sel) to reservation control logic 100.

As illustrated, reservation control logic 100 includes PLA 98 and requestor and command decode logic 102. When reservation control logic 100 recieves the encoded reservation message from memory directory control logic 104, reservation control logic 100 decodes the reservation message and performs any necessary updates to reservation register array 40. Finally, reservation control logic 100 transmits reservation status information (e.g., reservation invalid) to memory directory control logic 104, which in turn transmits the reservation information in conjunction with a MESI state to requesting L2 cache 26.

Figure 6:
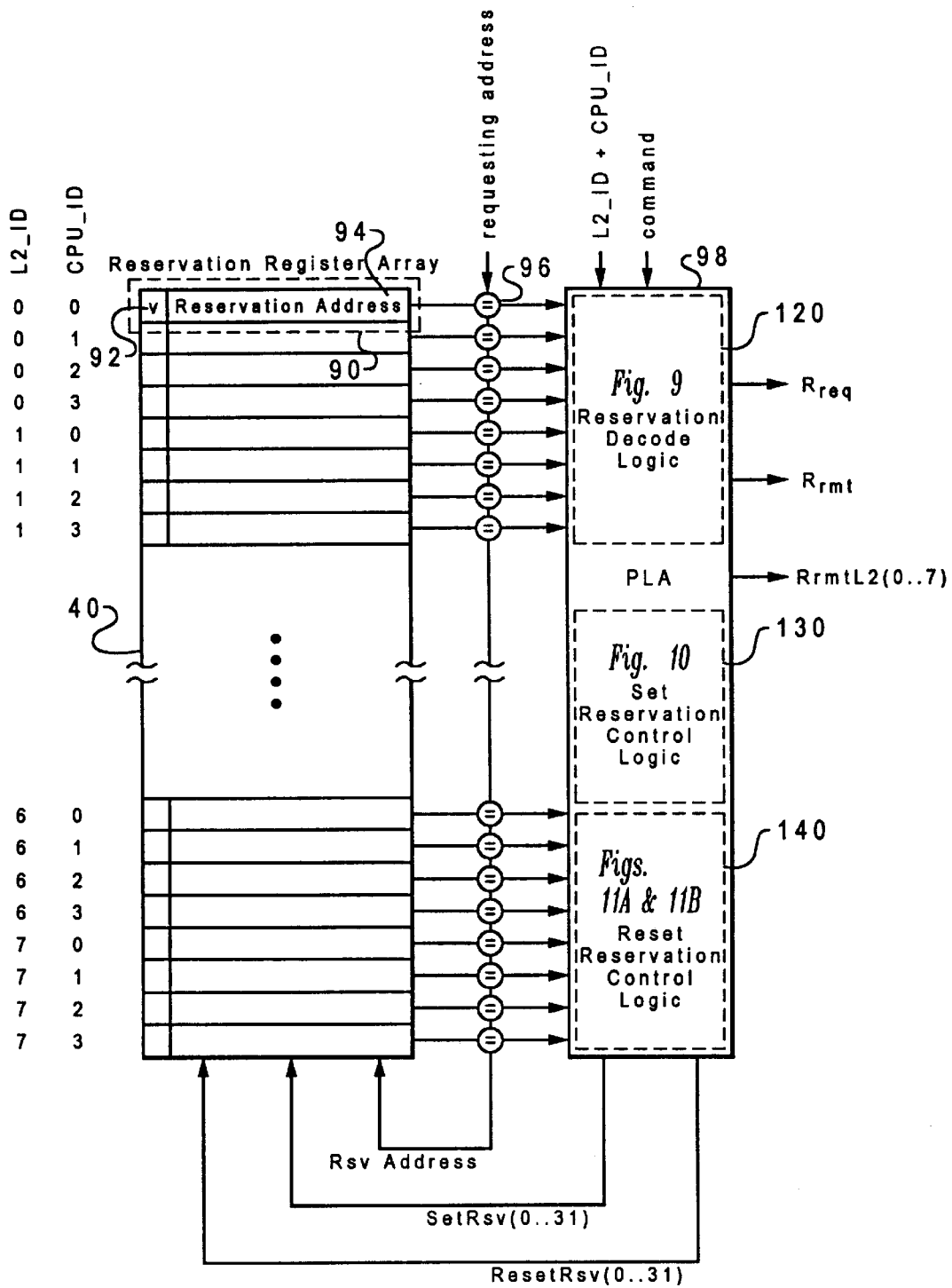
FIG. 6 illustrates a preferred embodiment of a reservation register array within a system memory module.

With reference now to FIG. 6, there is depicted a preferred embodiment of reservation register array 40 within memory module 36. FIG. 6 depicts an embodiment of the present invention in which the memory hierarchy illustrated in FIG. 2 includes 32 CPUs, which each have an on-board L1 cache, and eight L2 caches, which each are accessed by four of the L1 caches. As will be appreciated by those skilled in the art, the memory module reservation array depicted in FIG. 6 is applicable to MP data processing systems including any number of processors, L1 caches, and L2 caches.

As illustrated, each reservation register 90 within reservation register array 40 is indexed by L2 ID and CPU ID. Like reservation registers 24 and 30, each reservation register 90 stores the real address of the memory line reserved by the associated CPU in reservation address field 92 in conjunction with valid bit 94, which indicates if the associated CPU currently holds a reservation for the specified address.

Each reservation register 90 is coupled to an associated comparator 96. When a CPU executes a STCX instruction and the reservation can not be resolved at the CPU/L1 cache or L2 cache levels, the address of the memory line containing the variable to which the STCX is executed, called the requesting address, is compared in parallel with each reservation address stored within reservation register array 40. The output of the parallel compare operation is then input to PLA 98. Utilizing the input from each comparator 96 and additional inputs, PLA 98 resolves the reservation so that the STCX either completes successfully or fails, and updates the reservations stored in reservation register array 40. As depicted, PLA 98 comprises reservation decode logic 120, set reservation control logic 130, and reset reservation control logic 140.

Figure 7:
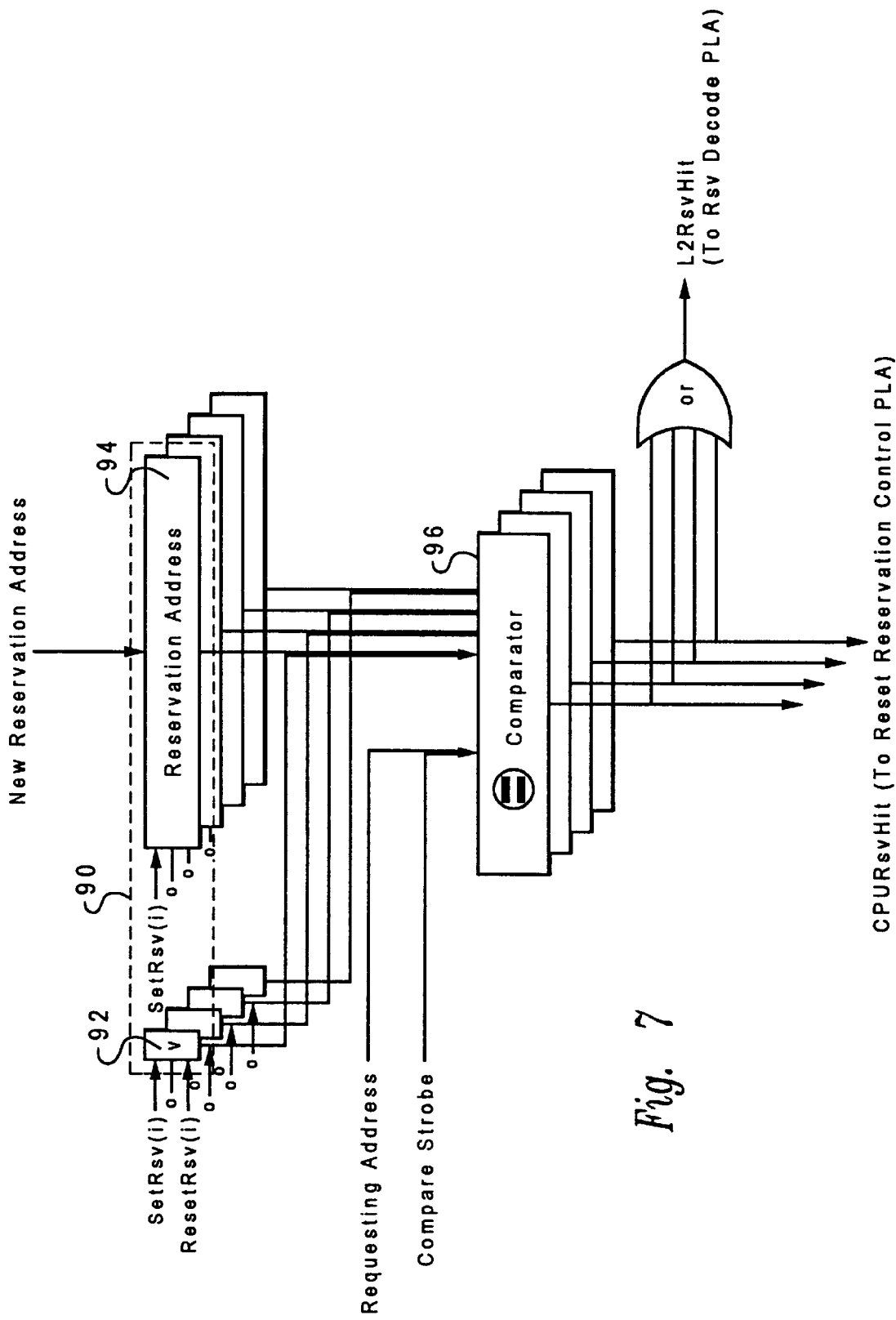
FIG. 7 depicts a more detailed block diagram of four reservation registers within the reservation register array depicted in FIG. 6.

Referring now to FIG. 7, there is depicted a more detailed block diagram illustration of four reservation registers, which are indexed by a single L2 ID, and their associated comparators. As described above, when a processor executes a STCX instruction which cannot be resolved at the CPU or L2 cache level, the address of the reserved memory line (i.e., the request address) is passed down to the appropriate system memory module 36 via interconnect 34 by the requesting L2 cache 26. The requesting address strobes the comparator associated with each reservation register within reservation register array 40. As illustrated, the four comparators indexed by an L2 ID have two outputs. The first output, CPURsvHit, is a 4-bit value that indicates which of the CPUs, if any, have a reservation for the requesting address. The second output, L2RsvHit, is derived by ORing the four CPURsvHit output lines. As indicated, the 4-bit CPURsvHit value is an input to reset reservation control logic 140 and the L2RsvHit bit is an input to reservation decode logic 120.

With reference now in general to FIGS. 9–11A & 11B, there is illustrated representations of reservation decode logic 120, set reservation control logic 130, and reset reservation control logic 140 within PLA 98. Each portion of PLA 98 is illustrated with logical inputs to PLA 98 above a horizontal line and logic outputs from PLA 98 below the horizontal line. A logical equation defining an output from the PLA is derived by ORing the product terms associated with the I-term entries within the output's row. These product terms are formed by ANDing the I-term entries (or the inverse of the O-term entries) within the column corresponding to an output's I-term entry. The derivation of the outputs of PLA 98 logic will become clear in reference to the following description of the logic equations for specific outputs.

Figure 9:
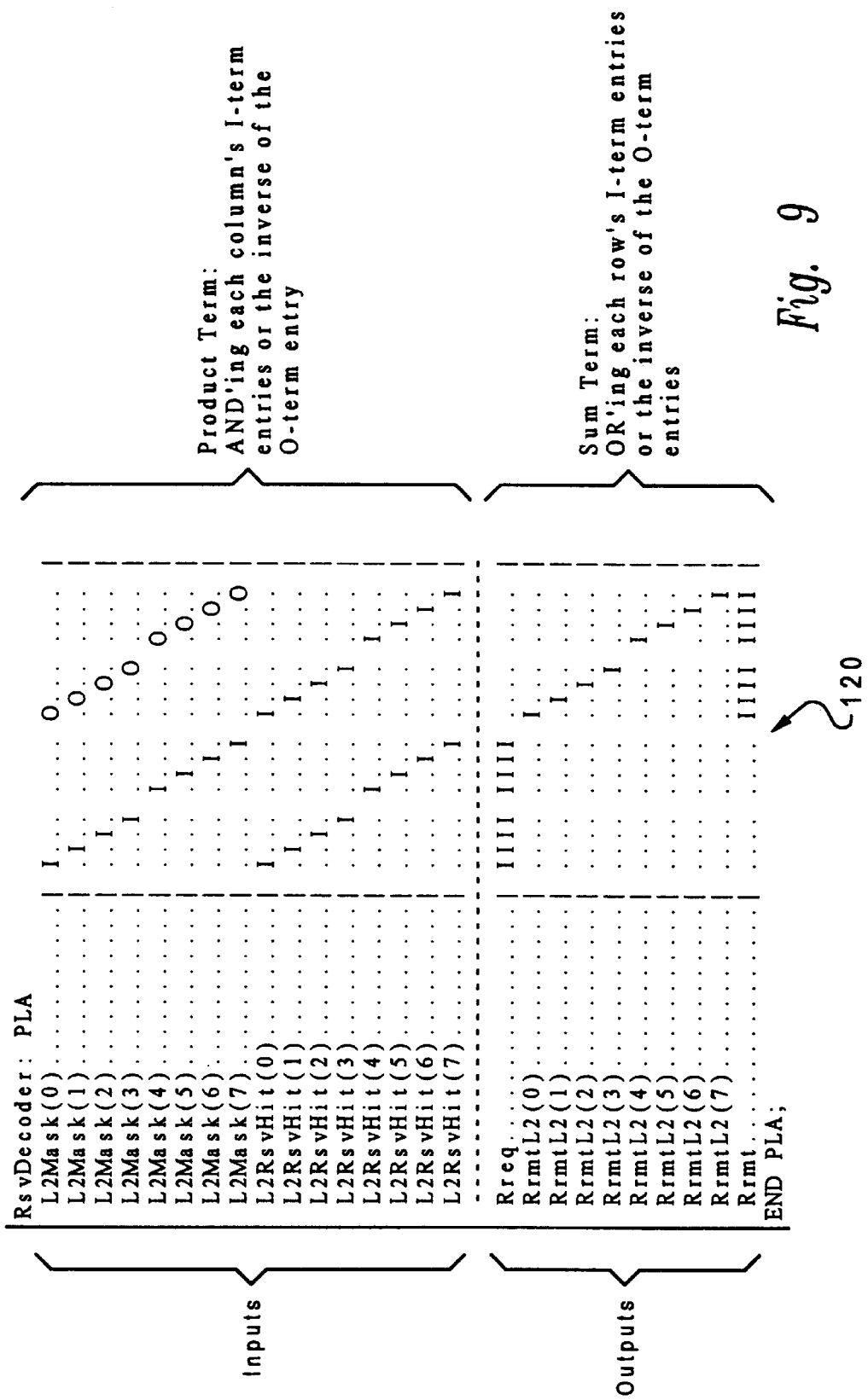
FIG. 9 depicts a representation of the Reservation Decode Logic within the PLA illustrated in FIG. 6.

Referring now to FIG. 9, there is depicted a representation of reservation decode logic 120. Reservation decode logic derives outputs Rreq, RrmtL2(i), and Rrmt from inputs L2Mask(i) and L2RsvHit(i). Rreq indicates whether the requesting L2 cache has a reservation for the requesting address. RrmtL2(i) specifies which, if any, of the nonrequesting L2 caches have an associated CPU which has a reservation for the requesting address. Finally, Rrmt indicates if any of the nonrequesting L2 caches have an associated CPU which has a reservation for the requesting address.

Reservation decode logic 120 defines the logic equation for Rreq as follows:

$$\begin{aligned}Rreq := \ &(L2Mask\ (0)\cdot L2RsvHit\ (0)) + (L2Mask\ (1)\cdot L2RsvHit(1)) + \\ &(L2Mask\ (2)\cdot L2RsvHit\ (2)) + (L2Mask\ (3)\cdot L2RsvHit(4)) + \\ &(L2Mask\ (3)\cdot L2RsvHit\ (4)) + (L2Mask\ (5)\cdot L2RsvHit(5)) + \\ &(L2Mask\ (6)\cdot L2RsvHit\ (6)) + (L2Mask\ (7)\cdot L2RsvHit(7))\end{aligned}$$

As was described in conjunction with FIG. 7, L2RsvHit (i) is derived by ORing the results of the comparisons between the requesting address and the reservation address associated with each of the four CPUs which access L2 cache (i). Thus, for example, L2RsvHit (0) indicates if any of the CPUs which access L2 cache (0) have a reservation for the requesting address. L2Mask (i), the other input to reservation decode logic 120, is derived from the identity of the requesting L2 cache by requestor and command decode logic 102 according to the following equation:

$$L2Mask\ (i) = 2**L2\ ID$$

For example, L2Mask (7) has an I-term in its seventh (most significant) bit position since 2** 7=10000000b.

As may be determined by inspection of reservation decode logic 120, the logic equation which describes the output RrmtL2 (i) is given by the formula:

$$RrmtL2\ (i) := \overline{L2Mask\ (i)} \cdot L2RsvHit\ (i)$$

This set of eight outputs specifies which nonrequesting L2 caches have a reservation for the requesting address. As is illustrated in FIG. 9, the last output Rrmt, which indicates that at least one nonrequesting L2 cache has a reservation for the requesting address, is derived by ORing the values of RrmtL2 (0)-RrmtL2 (7).

Figure 8:
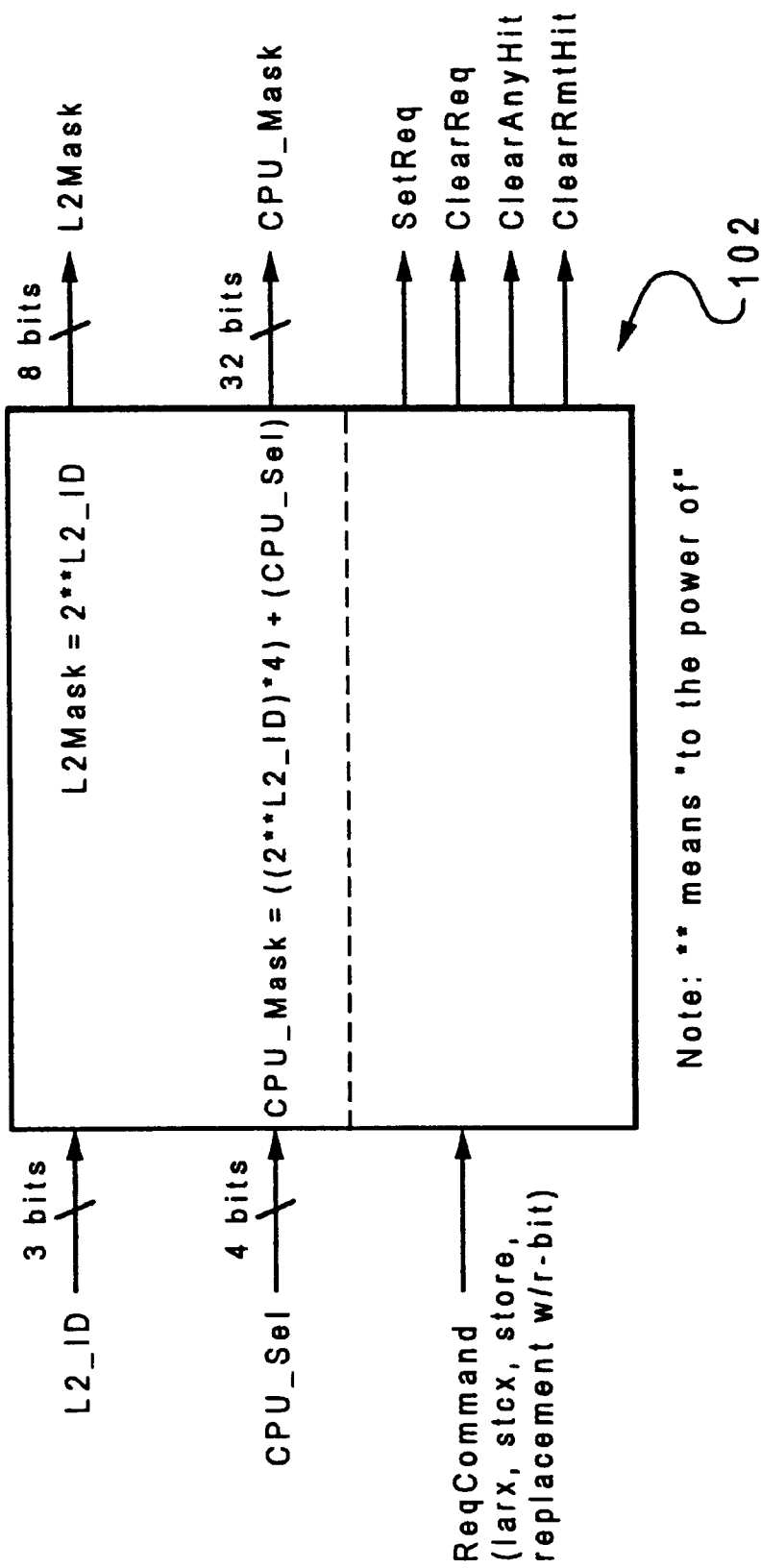
FIG. 8 illustrates a block diagram of the Requestor and Command Decode Logic depicted in FIG. 5.
Figure 10:
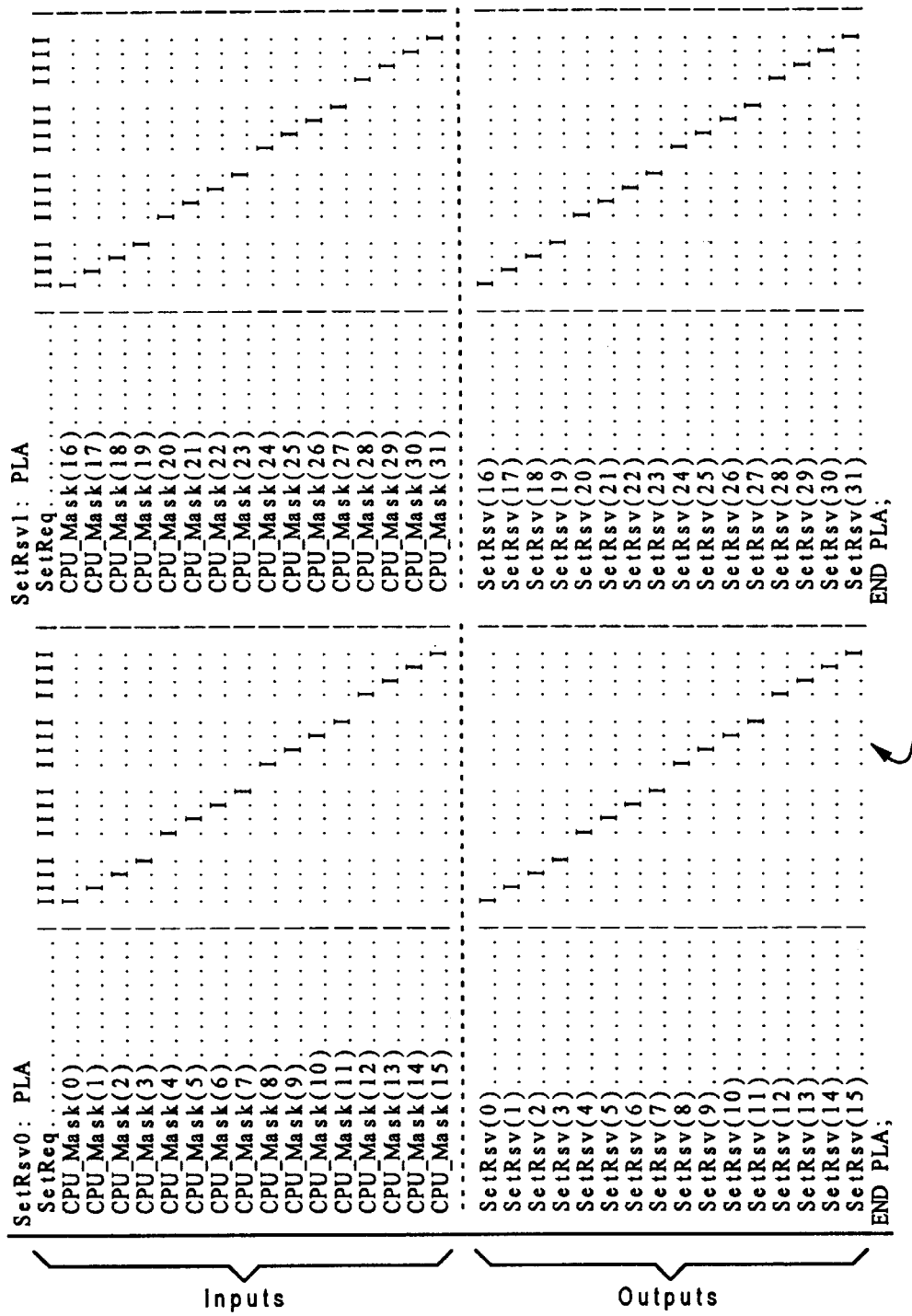
FIG. 10 illustrates a representation of the Set Reservation Control Logic within the PLA depicted in FIG. 6.

With reference now to FIG. 10, there is illustrated a representation of set reservation control logic 130 within PLA 98 of FIG. 6. The inputs CPU_Mask (i) are generated by requester and command decode logic 102 according to the equation illustrated in FIG. 8. From inspection of FIG. 10, it is evident that the equation for SetRsv (i) is given by the following equation:

$$SetRsv\ (i) := CPU\_Mask\ (i) \cdot SetReq$$

Utilizing the 32-bit SetRsv output, PLA 98 sets the valid bit of a reservation register within reservation register array 40 corresponding to the CPU for which a new reservation has been made at the system memory module level.

Figure 11A:
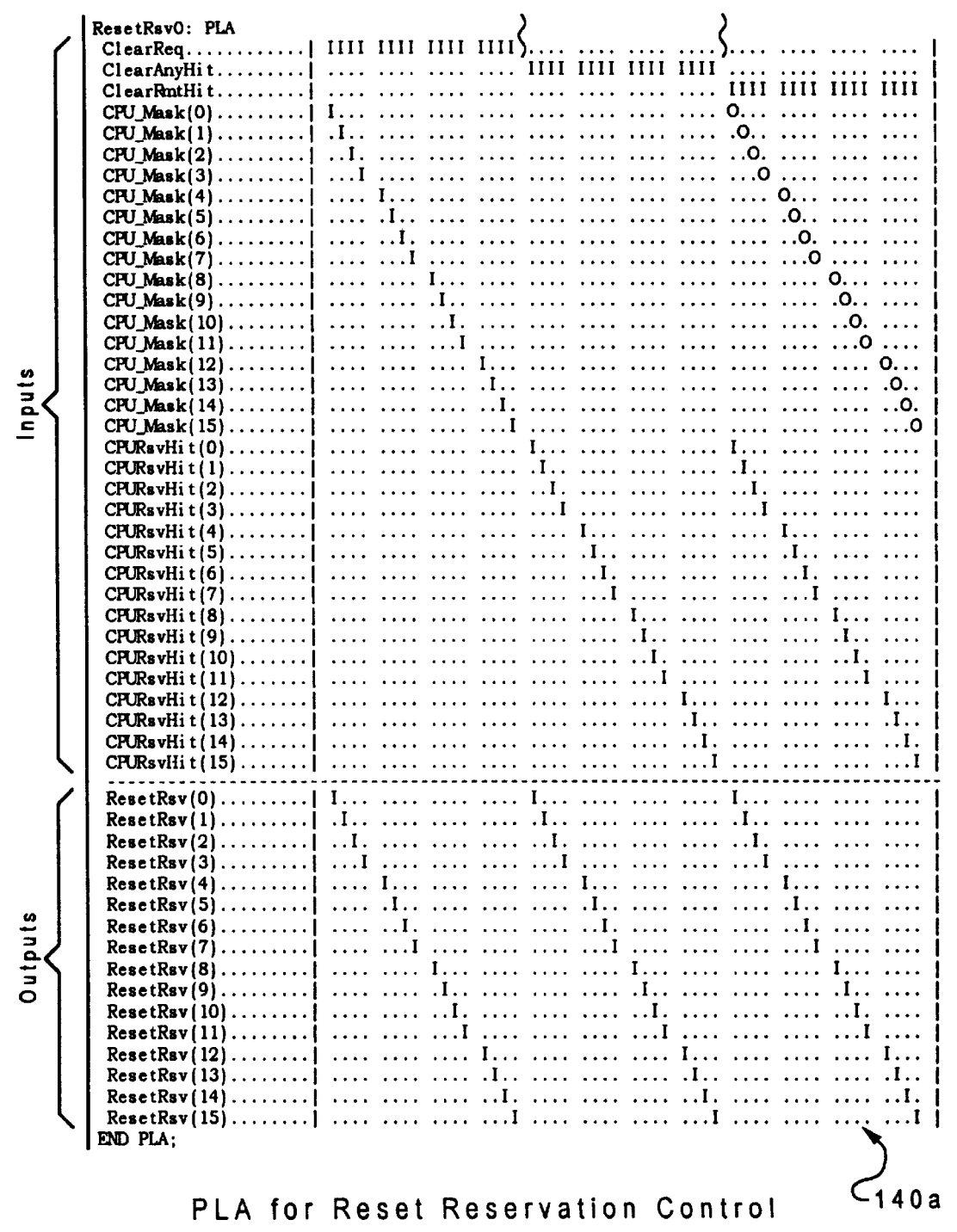

Referring now to FIGS. 11A and 11B, there is depicted reset reservation control logic 140 which resides within PLA 98. Inputs to reset reservation control logic 140 include the 32-bit CPURsvHit value, which is input from comparators 96, and the 32-bit CPU_Mask value generated according to the equation illustrated in FIG. 8. In addition, inputs to reset reservation control logic 140 include ClearReq, ClearAnyHit, and ClearRmtHit, which are decoded by requester and command decode logic 102 from the request command transmitted by the requesting L2 cache. Those skilled in art will appreciate that the logic equations utilized by request and command decode logic 102 to derive ClearReq, ClearAnyHit, and ClearRmtHit are determined by the characteristics of load-reserve and store-conditional instructions and are easily derived. Utilizing these inputs in addition to the CPU_Mask and CPURsvHit inputs, reset reservation control logic 140 derives a 32-bit ResetRsv (i) output to reservation register array 40. As is illustrated in FIGS. 11A and 11B, the logic equation for the ResetRsv output signal is given by the following formula:

$$ResetRsv(i) := (CPU\_Mask\,(i) \cdot ClearRequest) + \\ (CPURsvHit\,(i) \cdot ClearAnyHit) + \\ (CPURsvHit\,(i) \cdot \overline{CPU\_Mask\,(i)} \cdot ClearRrmtHit)$$

Utilizing this logic equation, reset reservation control logic 140 resets the valid bit of a reservation register within reservation register array 40 if: (1) the associated CPU successfully completed a LARX instruction; (2) the reserved line became invalid, thereby necessitating the clearing of all reservations of the invalidated line; or (3) a CPU other than the requesting CPU stored to the reserved location.

Resolving reservations at the system memory level

As has been described, the method and system of the present invention enable reservation requests to be resolved at the highest level within the memory hierarchy at which the memory line containing the reserved variable is owned exclusively. If a reservation request cannot be resolved at either the CPU or L2 cache levels, the reservation request if forwarded by the L2 cache 26 associated with the requesting CPU 20 to the system memory module 36 which stores the reserved memory line. Thus, if a reserved memory line is owned exclusively only at the lowest level within the memory hierarchy, the present invention, like prior art systems, transmits a reservation request to the system memory module level.

Returning to FIGS. 6 and 7, when a system memory module 36 is presented with a reservation request, the address of the reserved memory line (the request address) is compared in parallel with the reservation address stored in each reservation register 90. Utilizing the L2RsvHit input generated by the parallel comparison, reservation decode logic 120 determines the values of PLA outputs Rreq, Rrmt, and RrmtL2(0 . . . 7). If the requesting CPU 20 has the only valid reservation for the reserved memory line, Rreq will be returned with a 1 and Rrmt and RrmtL2 (0 . . . 7) will both be returned as 0. Memory module 36 will then transmit a reservation message to the requesting CPU that the requesting CPU owns the memory line exclusively. Consequently, the requesting CPU may successfully execute a STCX to the reserved variable. If the requesting CPU 20 owns the reserved memory line in a shared state, the outputs Rreq and Rrmt will be returned with a 1. RrmtL2 (0 . . . 7) will indicate which of the eight L2 caches have an associated processor which has a reservation for the reserved memory line. In this case, system memory module 36 issues a cross-interrogation request to the non-requesting processor(s) with reservations. The cross-interrogation request will clear the valid bit of the reservation registers at the non-requesting CPUs and set the line state associated with the reserved line to invalid.

Replacing a line containing a reserved variable at memory directory level

Typically, memory directory 38 within memory module 36 indexes only a portion of the total number of address within system memory module 36. In this usual case, entries within memory directory 38 must be replaced in response to L2 cache misses. When a memory directory line is replaced, the MESI protocol requires that the memory line also be purged from both the L1 and L2 caches associated with the CPU which initiated the data request. If the replaced line contains a reserved variable, the L1 and L2 caches replace the line containing the reserved variable in the manner hereinbefore described and acknowledge the replacement by transmitting a replacement reply to memory module 36, which stores the reserved line. Although the reserved line is no longer resident within L1 cache 22 or L2 cache 26, the reservation register associated with the reserving CPU 20 retains the valid bit set to a 1. When the system memory module 36 which stores the replaced line receives the replacement message, system memory module 36 stores the address of the replaced memory line into the reservation register 90 corresponding to the reserving CPU 20 and initializes the accompanying valid bit 92 to 1.

Clearing a reservation at L2 cache from memory directory level

When a system memory module 36 loads a line to an L2 cache 26 which contains a variable reserved by one of the L2 cache's associated CPUs, the reservation is cleared at the system memory level by resetting the valid bit within the reserving CPU's reservation register 90. This function is illustrated within reset reservation control logic 140 depicted in FIGS. 11A and 11B. As shown, ResetRsv (i) is active when a ClearReq input is present for CPU (i). Similarly, if a L2 cache line containing a reserved variable is loaded from L2 cache 26 to an associated L1 cache 22, the reservation at the L2 cache level is cleared. Although the reservation for a requested line is cleared at a lower level memory when the requested line is loaded to a higher level memory, the MESI state of the requested line is retained at the lower level memory. Utilizing the MESI state of a requested line, the lower level memory unit can resolve reservation requests for the requested line without maintaining a reservation since the line state indicates the identity of remote owners and the MESI state of the requested line with respect to the remote owners.

Sharing reservation variables in the same memory line

During the operation of a MP data processing system, it is likely that two or more CPUs will reserve either the same or different variables in the same memory line. If a variable within a memory line has been reserved by CPUa and CPUb issues a LARX to a variable within the same memory line, the line state of the line will be shared if the line is exclusive (unmodified or modified) in the L1 cache associated with CPUa or if the memory line is not resident within the L1 cache associated with the CPUa. In either case, the memory line is loaded into the L1 cache associated with CPUb and CPUb is granted a reservation for the memory line. However, neither CPUa nor CPUb may successfully execute a STCX to the reserved line until the issuing CPU obtains exclusive ownership of the reserved line by the hereinbefore described process of cross-interrogation of remote CPUs.

Resetting a reservation in response to a remote store

When CPUa has a memory line reserved and CPUb issues a store or STCX to the reserved line, CPUb cannot have the line exclusive in its associated L1 cache and must request for exclusive ownership of the shared line. This request is known as cross-interrogation. Since CPUb does not own the line exclusively, the execution of the store will generate a store miss cross-interrogation request. If the requested memory line is resident within CPUa's associated L1 cache, the cross-interrogation request will be forwarded from CPUb to CPUb's associated L2 cache and then to CPUa. In response to the cross-interrogation request, CPUa will invalidate the requested line and will clear the reservation for the memory line from its reservation register by setting the valid bit to 0. If, however, the requested line is not resident within CPUa's associated L1 cache, as indicated by the reservation register associated with CPUa being set with V=1 at the L2 cache, the cross-interrogation request will first cancel the reservation at the L2 cache level and then be passed to CPUa. Similarly, if the reservation is maintained at the system memory level, the cross-interrogation requests will be forwarded from the L2 cache to the appropriate system memory module. The system memory module will then clear the reserved line by marking the memory line invalid within the memory directory and will cancel the reservation by clearing the valid bit of the reservation register associated with CPUa. The system memory module will then forward the request to the L2 cache, which will cancel its reservation for the requested line and forward the request to the L1 cache associated with CPUa.

Exchanging a reservation at a CPU

If a CPU executes a LARX instruction before the CPU's reservation is reset (i.e., while V=1), the CPU replaces the current reserved variable with a new reserved variable and sets the valid bit to 1. If the memory line containing the old reserved variable was already purged from the CPU's associated L1 cache and the associated L2 cache or system memory module has placed the address of the reserved memory line into the reservation register associated with the reserving CPU, the reservation for the old variable is cleared at the L2 cache and system memory levels if the LARX request for the new reserved variable passes to the L2 cache or the system memory level to load the memory line containing the new reserved variable. However, if the CPU executes a LARX to a variable contained in a line resident within the CPU's associated L1 cache, the L2 cache and system memory module will not reflect the replacement of the reserved variable at the CPU level and will still reflect the old reserved variable in the reservation registers associated with the reserving CPU. Despite this reservation protocol inconsistency, the protocol will still operate correctly since the reservation registers at the L2 cache and memory directory levels are utilized only for global look-up from remote CPUs or to reset all reservations for a specific memory line. Thus, an L2 cache or memory directory may incorrectly pass remote store or STCX misses to a CPU to clear the reservation (i.e., set V=0) for the old reserved variable. However, these erroneous messages are ignored by the CPU since the address specified in the STCX miss message does not match the reservation address of the new reserved variable. Those skilled in the art will appreciate that in the alternative, an additional bit may allocated within each reservation register to indicate if the reserved line is resident within the memory unit. In this alternative embodiment, when a CPU exchanges a reserved variable for a new reserved variable, the control logic associated with the reservation register would send the status of the additional bit to lower levels within the memory hierarchy to clear the reservation registers at those levels.

Reservations protocol in a MP data processing system utilizing non-cacheable variables Although the method and system of the present invention have been described in reference to a MP data processing system architecture which utilizes cacheable reserved variables, the method and system of the present invention are also applicable to MP architectures in which reserved variables are non-cacheable, i.e., all load and store operations are performed directly between an issuing CPU and a system memory module. In architectures utilizing non-cacheable reserved variables, when a CPU executes a LARX instruction, a LARX request will be sent to the memory module storing the requested variable. The memory module will then provide the requested data and load the reservation register corresponding to the requesting CPU with the address of the memory line containing the reserved variable and initialize the valid bit to 1. When a CPU executes a STCX instruction, a STCX request is similarly passed to the system memory module which stores the reserved memory line. The STCX will successfully complete if the requesting CPU has a reservation for the requested variable. Otherwise, the STCX instruction will fail. Like architectures utilizing cacheable reserved variables, upon successful completion of a STCX instruction, the reservation register is cleared at the system memory module. A CPU's reservation of a variable is also cleared if the memory module receives a STCX or store request from another CPU to the reserved variable.

While the invention has been particularly shown and described with reference to a preferred embodiment, it will be understood by those skilled in the art that various changes in form and detail may be made therein without departing from the spirit and scope of the invention.

What is claimed is:

1. A multiprocessor data processing system, comprising:
    a plurality of processors;
    a memory hierarchy including two or more upper levels of memory, wherein each upper level within said memory hierarchy includes two or more memory units that each store a subset of all data stored within an associated memory unit at a lower level of said memory hierarchy, and wherein each memory unit at a top level within said memory hierarchy is associated with a respective one of said plurality of processors;
    a plurality of reservation indicators that are each associated with a respective memory unit within said memory hierarchy, wherein the reservation indicator of each memory unit at the top level can specify an address for which the associated processor holds a reservation upon which execution of a conditional memory update depends, and wherein the reservation indicator of each memory unit at each lower level within said memory hierarchy can specify addresses for which processors associated with memory units at higher levels within said memory hierarchy hold reservations upon which execution of conditional memory updates depend; and
    reservation control logic that, in response to execution by a requesting processor of a conditional memory update targeting a selected address, always determines if said conditional memory update should complete successfully at a selected memory unit associated with said requesting processor at a selected level within said memory hierarchy, wherein said selected memory unit stores data associated with said selected address exclusive of other memory units at said selected level and said selected level is a highest level in said memory hierarchy at which any memory unit stores said data exclusive of other memory units at that same level, said reservation control logic making said determination utilizing communication between only said requesting processor and only said selected memory unit if said selected level is said top level, and, if said selected level is not said top level, utilizing communication between only said requesting processor and only said selected memory unit and memory units above said selected level.

2. The multiprocessor data processing system of claim 1, wherein each of said plurality of reservation indicators comprises an address register for specifying a reservation address and a bit for indicating whether an associated processor holds a reservation for said reservation address.

3. The multiprocessor data processing system of claim 1, wherein said memory hierarchy comprises:

a plurality of level-one caches that form said top level of said memory hierarchy, wherein each of said plurality of level-one caches is associated with a respective one of said plurality of processors;

two or more level-two caches, wherein each of said level-two caches is associated with one or more of said plurality of level-one caches; and one or more main memory modules, wherein each of said main memory modules is accessible by all of said level-two caches.

4. The multiprocessor data processing system of claim 1, wherein said requesting processor performs said conditional memory update only in response to a determination that said conditional memory update should complete successfully by storing data associated with said selected address in said associated memory unit at said top level of said memory hierarchy.

5. The multiprocessor data processing system of claim 3, wherein:

said reservation control logic determines that said conditional memory update should complete successfully utilizing communication between said requesting processor and only an associated level-one cache, if said associated level-one cache stores said data associated with said selected address exclusive of other level-one caches and said reservation indicator of said associated level-one cache specifies that said requesting processor has a reservation for said selected address; and said reservation control logic determines whether said conditional memory update should complete successfully utilizing communication between said requesting processor and only an associated level-two cache and one or more of said level-one caches, if said reservation indicator of said associated level-one cache specifies that said requesting processor has a reservation for said selected address but said associated level-one cache does not store said data associated with said selected address exclusive of other level-one caches and said associated level-two cache stores said data associated with said selected address exclusive of any other level-two cache.

6. A method of supporting memory updates within a data processing system including a plurality of processors and a memory hierarchy including two or more upper levels of memory, wherein each upper level within said memory hierarchy includes two or more memory units that each store a subset of data stored within an associated memory unit at a lower level within said memory hierarchy, and wherein each memory unit includes a reservation indicator, said method comprising:

in response to a particular processor among said plurality of processors executing an instruction that reserves a selected address, setting a reservation indicator associated with said particular processor that specifies said selected address for which said processor holds a reservation upon which execution of a conditional memory update depends;

maintaining said reservation of said particular processor in reservation indicators of one or more memory units associated with said particular processor, wherein said one or more memory units include a memory unit at a top level within said memory hierarchy; and in response to execution of a conditional memory update targeting said selected address by said particular processor, always determining if said conditional memory update should complete successfully at a selected level within said memory hierarchy that is a highest level at which an associated memory unit stores data associated with said selected address exclusive of other memory units at that level, wherein said determination is made utilizing communication between said particular processor and only said associated memory unit if said selected level is said top level, and, if said selected level is not said top level, utilizing communication between only said particular processor and only said associated memory unit and memory units above said selected level.

7. The method of supporting memory updates within a data processing system of claim 6, wherein said step of maintaining said reservation of said particular processor in reservation indicators of one or more memory units comprises:

storing said selected address within a reservation register in conjunction with a bit indicating whether said particular processor holds a reservation for said selected address.

8. The method of supporting memory updates within a data processing system of claim 6, wherein said step of always determining if said conditional memory update should complete successfully comprises:

determining if said reservation indicator within said associated memory unit at said selected level indicates that said particular processor has a reservation for said selected address.

9. The method of supporting memory updates within a data processing system of claim 6, and further comprising:

in response to a determination that said conditional memory update should complete successfully, permitting said particular processor to update said data associated with said selected address.

10. The method of supporting memory updates within a data processing system of claim 6, wherein said step of maintaining said reservation of said particular processor in reservation indicators comprises:

maintaining said reservation of said particular processor within reservation indicators of only memory units that are at or above said selected level within said memory hierarchy.

11. The method of supporting memory updates within a data processing system of claim 6, wherein said two or more upper levels of memory include a plurality of level-one caches that are each associated with a respective one of said plurality of processors and two or more level-two caches that are each associated with one or more of said plurality of level-one caches, said memory hierarchy further including one or more main memory modules that are each accessible by all of said level-two caches, wherein said step of always determining if said conditional memory update should complete successfully comprises:

determining, utilizing communication between said particular processor and only an associated level-one cache, whether said associated level-one cache stores said data associated with said selected address exclusive of other level-one caches and whether said reservation indicator of said associated level-one cache specifies that said particular processor has a reservation for said selected address;

in response to a determination that said associated level-one cache stores said data associated with said selected address exclusive of other level-one caches and that said reservation indicator of said associated level-one cache specifies that said particular processor has a reservation for said selected address, permitting said particular processor to update said data associated with said selected address; and in response to a determination that said reservation indicator of said associated level-one cache specifies that said requesting processor has a reservation for said selected address but said associated level-one cache does not store said data associated with said selected address exclusive of other level-one caches, determining whether said conditional memory update should complete successfully utilizing communication between said requesting processor and only an associated level-two cache and one or more of said level-one caches, if said associated level-two cache stores said data associated with said selected address exclusive of any other level-two cache.

12. The method of supporting memory updates within a data processing system of claim 6, and further comprising:

only in response to a determination that said conditional memory update should complete successfully, storing data associated with said selected address in said memory unit at said top level that is associated with said particular processor.

13. The method of supporting memory updates within a data processing system of claim 8, wherein said step of always determining if said conditional memory update should complete successfully comprises:

if said reservation of said particular processor for said selected address is not maintained within said associated memory unit at said selected level within said memory hierarchy, determining if said conditional memory update should complete successfully by referencing memory coherency protocol information in said associated memory unit that is associated with said selected address.

14. A system for supporting memory updates within a data processing system including a plurality of processors and a memory hierarchy including two or more upper levels of memory, wherein each upper level within said memory hierarchy includes two or more memory units that each store a subset of data stored within an associated memory unit at a lower level within said memory hierarchy, and wherein each memory unit includes a reservation indicator, said system comprising:

means, responsive to a particular processor among said plurality of processors executing an instruction that reserves a selected address, for setting a reservation indicator associated with said particular processor that specifies said selected address for which said processor holds a reservation upon which execution of a conditional memory update depends;

means for maintaining said reservation of said particular processor in reservation indicators of one or more memory units associated with said particular processor, wherein said one or more memory units include a memory unit at a top level within said memory hierarchy; and means, responsive to execution of a conditional memory update targeting said selected address by said particular processor, for always determining if said conditional memory update should complete successfully at a selected level within said memory hierarchy that is a highest level at which said associated memory unit stores data associated with said selected address exclusive of other memory units at that level, wherein said means for determining makes said determination utilizing communication between said particular processor and only said associated memory unit if said selected level is said top level, and, if said selected level is not said top level, utilizing communication between only said particular processor and only said associated memory unit and memory units above said selected level.

15. The system for supporting memory updates within a data processing system of claim 14, wherein said means for maintaining said reservation of said particular processor in reservation indicators of one or more memory units comprises:

means for storing said selected address within a reservation register in conjunction with a bit indicating whether said particular processor holds a reservation for said selected address.

16. The system for supporting memory updates within a data processing system of claim 14, wherein said means for always determining if said conditional memory update should complete successfully comprises:

means for determining if said reservation indicator within said associated memory unit at said selected level indicates that said particular processor has a reservation for said selected address.

17. The system for supporting memory updates within a data processing system of claim 14, and further comprising:

means, responsive to a determination that said conditional memory update should complete successfully, for permitting said particular processor to update said data associated with said selected address.

18. The system for supporting memory updates within a data processing system of claim 14, wherein said means for maintaining said reservation of said particular processor in reservation indicators comprises:

means for maintaining said reservation of said particular processor within reservation indicators of only memory units that are at or above said selected level within said memory hierarchy.

19. The system for supporting memory updates within a data processing system of claim 14, wherein said one or more upper levels of memory include a plurality of level-one caches that are each associated with a respective one of said plurality of processors and two or more level-two caches that are each associated with one or more of said plurality of level-one caches, said memory hierarchy further including one or more main memory modules that are each accessible by all of said level-two caches, wherein said means for always determining if said conditional memory update should complete successfully comprises:

means for determining, utilizing communication between said particular processor and only an associated level-one cache, whether said associated level-one cache stores said data associated with said selected address exclusive of other level-one caches and whether said reservation indicator of said associated level-one cache specifies that said particular processor has a reservation for said selected address;

means, responsive to a determination that said associated level-one cache stores said data associated with said selected address exclusive of other level-one caches and that said reservation indicator of said associated level-one cache specifies that said particular processor has a reservation for said selected address, for permitting said particular processor to update said data associated with said selected address; and means, responsive to a determination that said reservation indicator of said associated level-one cache specifies that said requesting processor has a reservation for said selected address but said associated level-one cache does not store said data associated with said selected address exclusive of other level-one caches, for determining whether said conditional memory update should complete successfully utilizing communication between said requesting processor and only an associated level-two cache and one or more of said level-one caches, if said associated level-two cache stores said data associated with said selected address exclusive of any other level-two cache.

20. The system for supporting memory updates within a data processing system of claim 16, wherein said means for always determining if said conditional memory update should complete successfully comprises:

means, responsive to said reservation of said particular processor not being maintained within said associated memory unit at said selected level within said memory hierarchy, for determining if said conditional memory update should complete successfully by referencing memory coherency protocol information in said associated memory unit that is associated with said selected address.

\* \* \* \* \*